(12) United States Patent
Treis

(10) Patent No.: US 6,279,793 B1
(45) Date of Patent: Aug. 28, 2001

(54) REMOVAL AID FOR A SPARE WHEEL

(75) Inventor: Michael Treis, Lengdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/526,741

(22) Filed: Mar. 16, 2000

(30) Foreign Application Priority Data

Mar. 31, 1999 (DE) .............................. 199 14 537

(51) Int. Cl.[7] .................................................. B62D 43/00
(52) U.S. Cl. ................................ 224/42.23; 224/42.26; 224/538; 414/463; 414/466
(58) Field of Search .......................... 224/42.23, 42.26, 224/538; 414/463, 466; 296/37.2

(56) References Cited

U.S. PATENT DOCUMENTS

| 1,813,094 | * | 7/1931 | Appel | 414/463 |
|---|---|---|---|---|
| 1,913,835 | * | 6/1933 | Golike | 414/466 |
| 3,782,568 | * | 1/1974 | Alexander | 414/466 |
| 3,940,041 |   | 2/1976 | Bott . |  |
| 4,087,032 | * | 5/1978 | Miller et al. | 224/42.23 |
| 4,676,415 |   | 6/1987 | Kennedy . |  |
| 4,805,817 | * | 2/1989 | Helterbrand | 224/42.23 |
| 5,238,358 | * | 8/1993 | Higgins et al. | 414/463 |
| 5,803,324 | * | 9/1998 | Silberman et al. | 224/42.23 |

FOREIGN PATENT DOCUMENTS

| 40 40 950 | 12/1990 | (DE) . |
| 2 731 977 | 9/1996 | (FR) . |
| 2 155 421 | 9/1985 | (GB) . |

* cited by examiner

Primary Examiner—Stephen K. Cronin
(74) Attorney, Agent, or Firm—Crowell & Moring, L.L.P.

(57) ABSTRACT

The present invention relates to a removal aid for a spare wheel of a motor vehicle having at least one strap which, at one end, is fastened to a vehicle body section, extends from there under the spare wheel and beyond it and can be braced at the other end with another vehicle body section, a spare wheel receiving device being slidably constructed with respect to the strap.

23 Claims, 3 Drawing Sheets

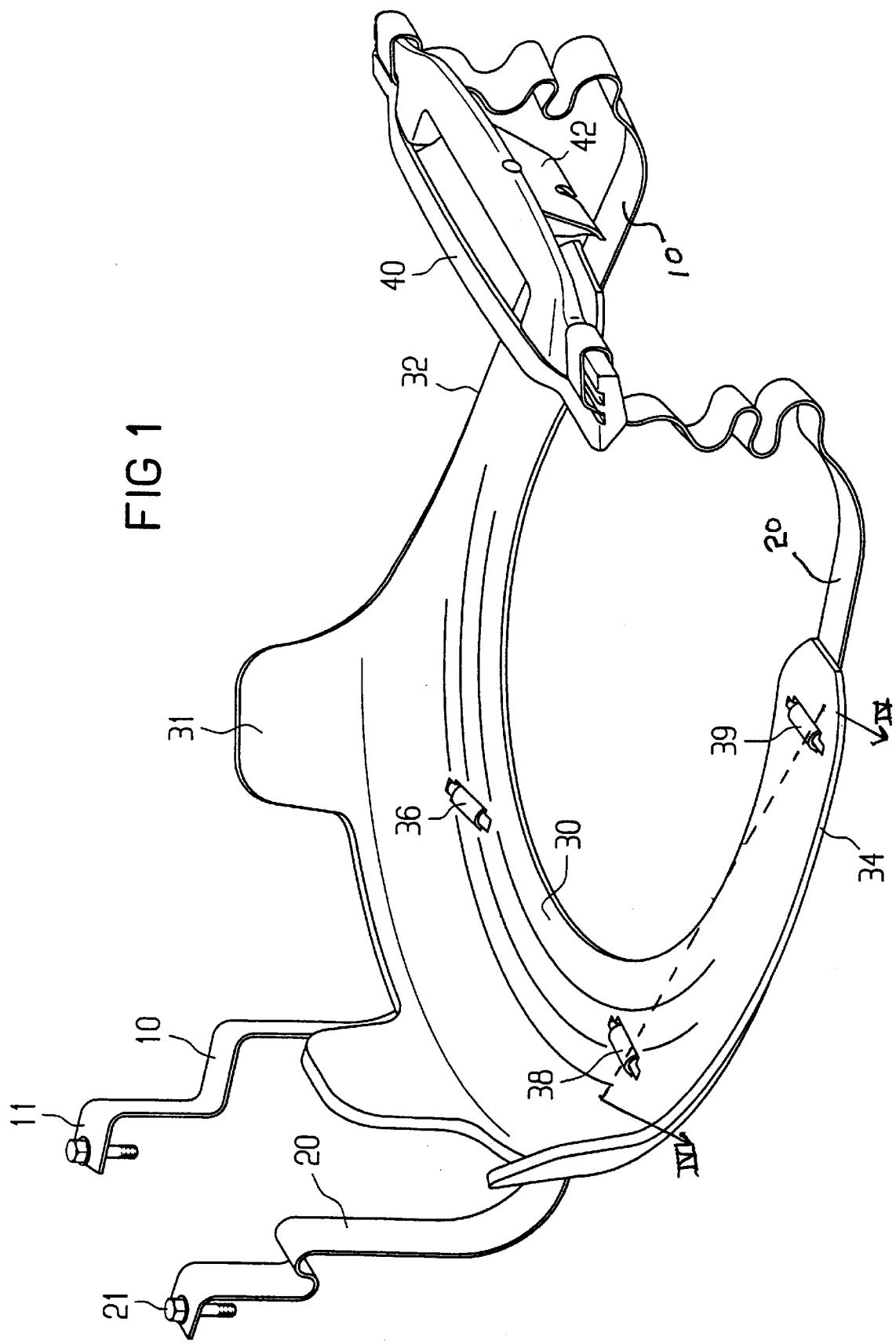

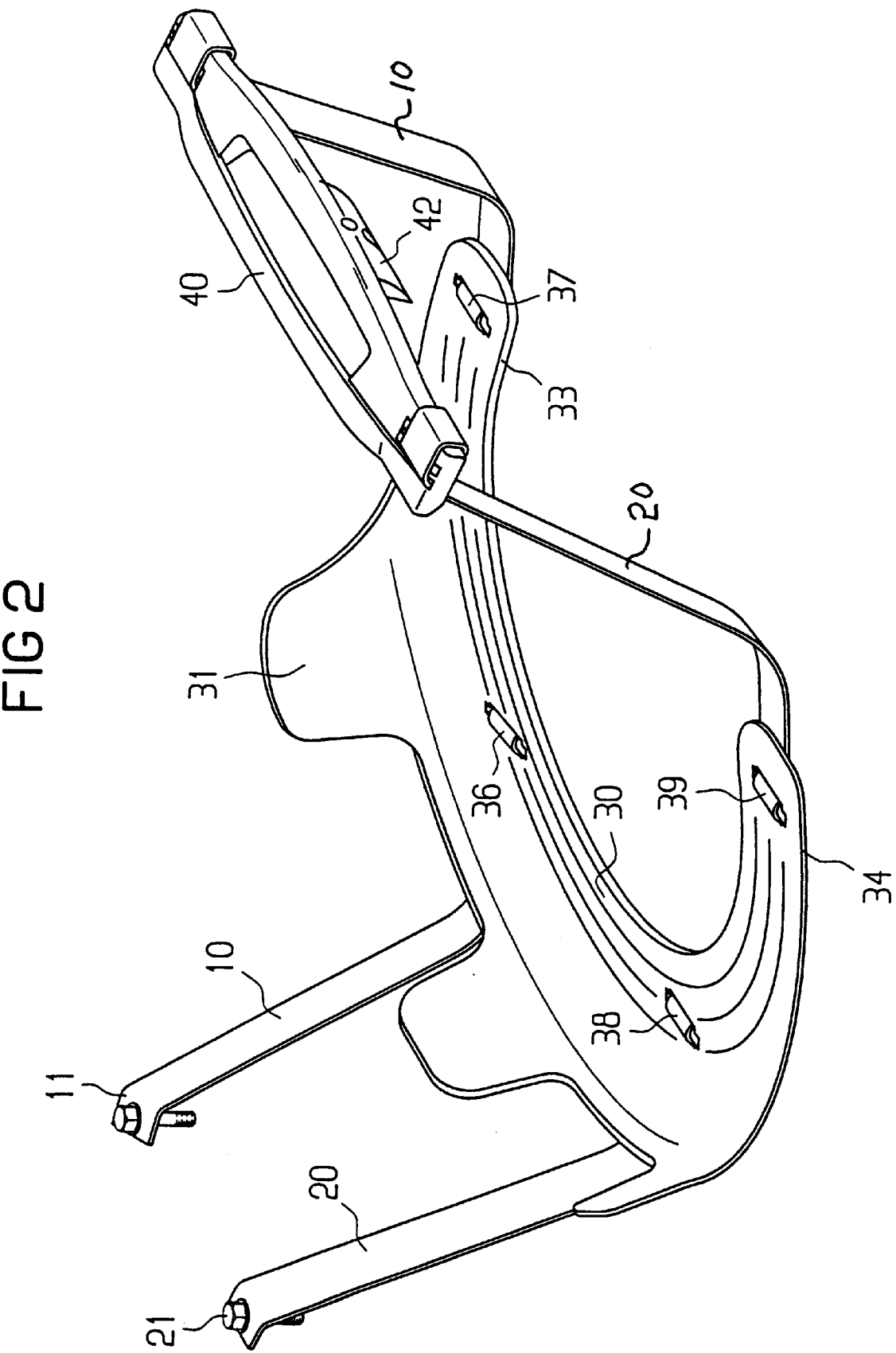

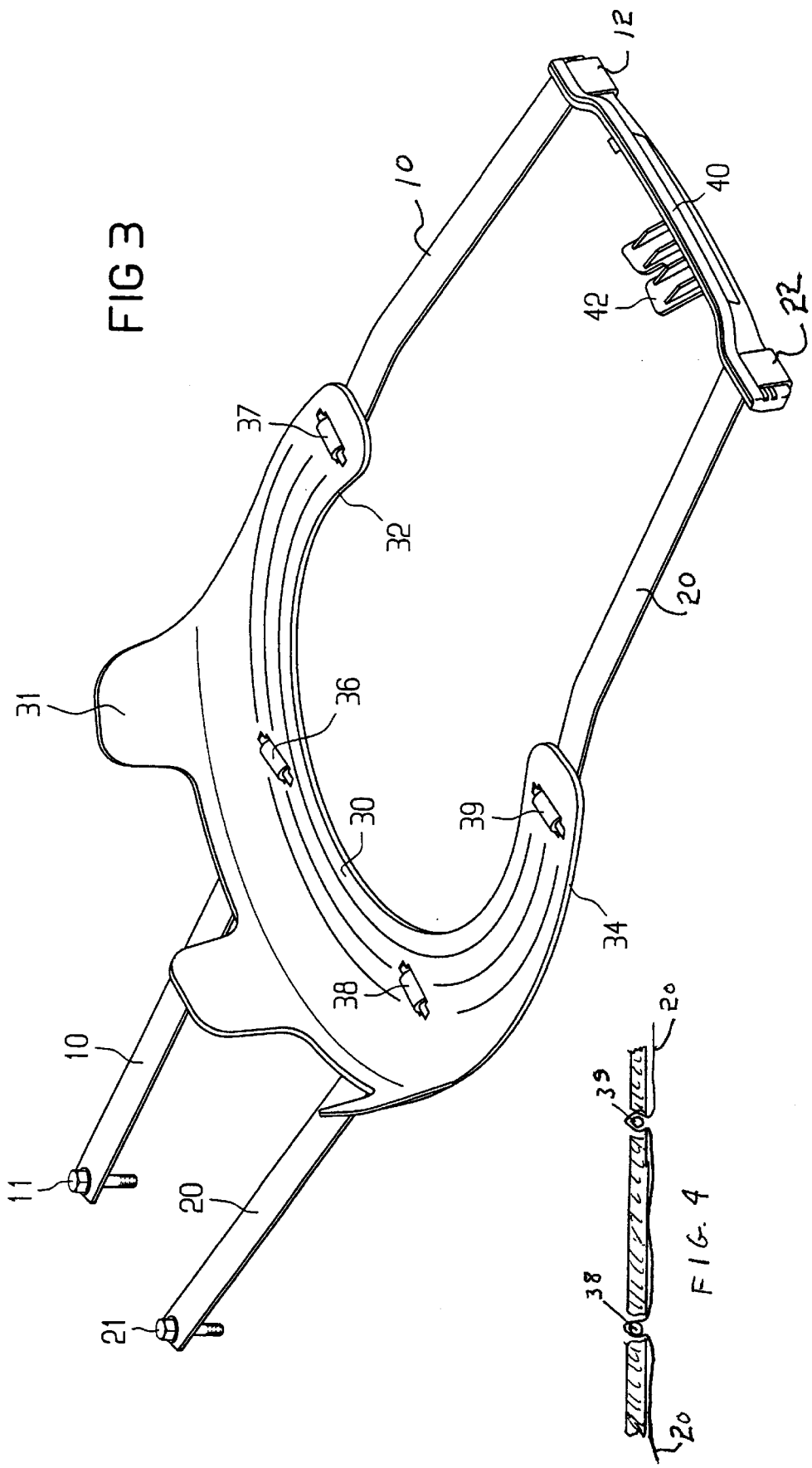

REMOVAL AID FOR A SPARE WHEEL

BACKGROUND AND SUMMARY OF THE INVENTION

This application claims the priority of 199 14 537.7, filed Mar. 31, 1999, the disclosure of which is expressly incorporated by reference herein.

The present invention relates to a removal aid for a spare wheel.

From German Patent Document DE-C-40 40 950, a removal aid of the above-mentioned type is known for a spare wheel of a motor vehicle. This known removal aid comprises a strap which is fastened at one end to a vehicle body section, specifically the spare wheel pan. The strap extends from there under the spare wheel and beyond this spare wheel. The other end may be fastened under tension to another vehicle body section, specifically the sill of the trunk. Therefore, by means of the tension strap, the spare wheel can be lifted and, after the tensioning of the strap, can be pulled out and/or inserted by way of the inclined plane formed by the strap. Correspondingly, although this known removal aid provides a certain force reduction when installing and removing the spare wheel, there is a considerable risk that the spare wheel may slide laterally from the inclined plane formed by the strap. Particularly in the case of heavy and cumbersome spare wheels, It is possible that the trunk may be damaged and/or become dirty.

It is therefore an object of the present invention to further develop a removal aid for a spare wheel of a motor vehicle such that the above-mentioned disadvantages are eliminated. In other words, a removal aid of the above-mentioned type for a spare wheel is to be further developed such that the spare wheel can be removed from and inserted into the spare wheel pan in a targeted manner.

According to the invention, this object is achieved by means of a removal aid for a spare wheel of a motor vehicle having at least one strap which, at one end, is fastened to a vehicle body section, extends from there under the spare wheel and beyond this spare wheel and which, at its other end can be braced with another vehicle body section, and wherein a spare wheel receiving device is provided which has a slidable construction with respect to the at least one strap.

In particular, according to the invention, a removal aid for a spare wheel of a motor vehicle is indicated which has at least one strap which is fixed at one end on a vehicle body section, extends from there under the spare wheel and beyond the latter and which, at the other end, can be braced with another vehicle body section, the removal aid being characterized by a spare wheel receiving device which has a slidable construction with respect to the strap. Correspondingly, according to the invention, a type of carriage is provided on the strap by means of which carriage the spare wheel can be slidably displaced on the strap in the tensioned condition. Correspondingly, a targeted movement can take place when the spare wheel is inserted and removed. The risk of a lateral sliding-off of the spare wheel can virtually be excluded by the slidably constructed spare wheel receiving device.

Advantageously, the spare wheel receiving device is essentially constructed in the shape of a half-shell. This half-shell can be formed, for example, as a plastic injection molded part or of metal; for example, adapted to the geometry of the spare wheel pan and/or of the spare wheel to be supported.

In order to achieve a guidance which is improved in the displacement direction, the spare wheel receiving device advantageously comprises at least one rail-shaped strip.

In the case of a preferred embodiment, the spare wheel receiving device comprises spare wheel fixing devices so that the spare wheel can be fixed with respect to the spare wheel receiving device; for example, in that the spare wheel can be screwed to the spare wheel receiving device.

Advantageously, the strap is guided at at least two points on the spare wheel receiving device. The strap can, for example, be slidably guided with respect to the spare wheel receiving device on two sections constructed in a buckle-type manner. In the case of a particularly preferred embodiment, the strap is guided on the one side on a radial section of the half-shell-shaped spare wheel receiving device and, on the other side, on a distal end of the strip constructed in the shape of a rail.

In order to improve the handling of the removal aid, a grip can be assigned to the strap and is, for example, sewn to it. By means of the grip, the spare wheel can be lifted in a simple manner with a low expenditure of force.

In the case of a preferred embodiment, a tensioning device is assigned to the strap which is used for an interaction with a recess constructed on another vehicle body section. In a particularly preferred embodiment, the recess is constructed in a shape of a keyhole on another vehicle body section in order to ensure a simple engaging and disengaging of the strap with the other vehicle body section.

The other vehicle body section advantageously is a movable vehicle body section, such as the lower part of a two-part tail gate, so that the desired tensioning of the strap can be achieved by moving the movable vehicle body section.

In a further development of the removal aid according to the invention, at least two straps are provided. By providing several straps, a stable and/or wider inclined plane can be formed in the tensioned condition so that the possibility of a tilting of the spare wheel can be reduced further.

Finally, it is preferred that, in the tensioned condition, the straps extend essentially in parallel, particularly essentially in the vehicle direction.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of a spare wheel removal aid according to a preferred embodiment of the invention and shown in an initial position;

FIG. 2 is a perspective view of the embodiment illustrated in FIG. 1, shown in an intermediate position;

FIG. 3 is a view of the embodiment illustrated in FIGS. 1 and 2, shown in an end position; and FIG. 4 is a schematic partial view taken along section plane IV—IV of FIG. 1 and showing the sliding connection of one of the straps in the removal aid.

DETAILED DESCRIPTION OF THE DRAWINGS

FIG. 1 is a perspective view of a preferred embodiment of the removal aid according to the invention in an initial position. According to this embodiment, the removal aid for a spare wheel comprises two straps 10, 20 which, in the illustrated position, extend loosely below a spare wheel which is not shown. At one end 11, 21, the two straps 10, 20 are fastened by means of screws or other suitable devices to a vehicle body section, such as a cross member. From these ends 11, 21, the straps 10, 20 extend to the spare wheel, which is not shown, under this spare wheel and beyond it to the opposite ends 12, 22. In the area in which the straps 10, 20 extend under the spare wheel, a spare wheel receiving device 30 is provided in the illustrated embodiment. In the shape of a half shell, this spare wheel receiving device 30 can essentially support the spare wheel from below.

The spare wheel receiving device of the embodiment illustrated here is constructed as an injection-molded plastic part and is constructed at two points 38, 39 and 36, 37 respectively for the interaction with one strap 10, 20 respectively. The interaction taking place at points 36, 37, 38, 39 should permit a sliding of the spare wheel receiving device 30 along the straps 10, 20. In the embodiment illustrated here, the engagement provided at points 36, 37, 38, 39 between the straps 10, 20 and the spare wheel receiving device 30 is constructed similar to a buckle; that is, the straps 10, 20 are slidingly guided in eyes at the respective points 36, 37, 38, 39.

As mentioned above, the spare wheel receiving device is essentially constructed in the shape of a half-shell, the spare wheel receiving device of the embodiment illustrated here also comprising rail-shaped strips 32, 34, so that the respective points 36, 37 and 38, 39 can be constructed to be farther away from one another. In addition to the supporting surface for the spare wheel, the spare wheel receiving device 30 has partially constructed stop faces 31 which are used for fixing the spare wheel.

Viewed in the vehicle direction behind the spare wheel, the belts 10, 20 are connected with a grip 40, by means of which the belts or straps 10, 20 can be tensioned. In order to ensure a vehicle-body-side tensioning, a tensioning device 42 is assigned to the grip 40, which tensioning device 42 can interact with an opening in a vehicle body section formed for this purpose.

FIG. 2 shows the removal aid for a spare wheel, which is illustrated in FIG. 1, in a center position, in which the straps 10, 20 are slightly tensioned by means of the grip 40. As the result of the tensioning of the straps 10, 20, in the illustrated position, the spare wheel receiving device 30 is slightly lifted at the forward end. A person skilled in the art will recognize that, in the event of a low friction at point 36, 37, 38, 39, when the straps 10, 20 are tensioned, the spare wheel receiving device 30 is lifted essentially uniformly, while it is particularly preferred that a certain friction exists at points 36, 37, 38, 39 between the spare wheel receiving device 30 and the straps 10, 20, so that when the straps 10, 20 are acted upon, a sliding movement can take place only after the lifting has occurred. The person skilled in the art will recognize that many varied adjusting possibilities exist in this respect.

FIG. 3 finally shows the embodiment, which is illustrated in FIGS. 1 and 2, in the end position, in which case the straps 10, 20 are completely tensioned and extend essentially in a plane. Thus, the straps 10, 20 form an inclined plane, on which the spare wheel can be moved back and forth by means of the slidable spare wheel receiving device 30 and can therefore be removed from the trunk or inserted into the trunk in a precise position and with a low expenditure of force. Since the two straps 10, 20 are provided at a certain distance from one another and extend essentially in the vehicle direction, there is no risk that the spare wheel may tilt and may slide from the inclined plane. Also, by means of the fixing devices 31, which are constructed as simple stops in the illustrated embodiment, a movement of the spare wheel with respect to the spare wheel receiving device 30 is inhibited.

Taking into account the sequence of movements of FIGS. 1 to 3, the person skilled in the art will recognize that, in the illustrated embodiment, the tensioning device 42 is constructed in such a form that it can interact, for example, with the lower section of a two-part tail gate, so that, when the straps 10, 20 in FIG. 2 are slightly acted upon by tension, an engagement can be achieved between the device 42 and the tail gate. When the lower part of the vehicle tail gate is then opened up, the position illustrated in FIG. 3 is achieved, which, when the lower part of the tail gate is opened up, automatically permits the tensioning of the straps and thus the removal of the spare wheel.

Summarizing, it may be noted that, by means of the suggested solution, a spare wheel can be removed and inserted at low expenditures of force and in a precisely positioned manner, so that it is virtually impossible that the surrounding trunk is damaged or becomes dirty. The person skilled in the art should recognize that, although the present invention was described in detail with reference to a currently preferred embodiment, many different changes and modifications are conceivable within the scope of the claims. In particular, it should be mentioned that, instead of the described two straps, an individual, optionally wide strap can also be used. Furthermore, the person skilled in the art will recognize that. for the interaction between the strap and the spare wheel receiving device, many different guiding possibilities can be used, if a slidable movement of the spare wheel receiving device is ensured. Finally, the person skilled in the art will recognize that, in addition to the simple stop faces, other fixing devices can be provided in order to obtain a corresponding fixing between the spare wheel receiving device and the spare wheel.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Removal aid for a spare wheel of a motor vehicle having at least one strap which, at one end, is fastened to a vehicle body section, extends from there under the spare wheel and beyond this spare wheel and which, at its other end can be braced with another vehicle body section, wherein a spare wheel receiving device is provided which has a slidable construction with respect to the at least one strap.

2. Removal aid according to claim 1,
wherein the spare wheel receiving device comprises at least one rail-shaped strip.

3. Removal aid according to claim 1,
wherein the spare wheel receiving device comprises spare wheel fixing devices.

4. Removal aid according to claim 1,
wherein a tensioning device is assigned to the at least one strap, which tensioning device is used for interaction with a particularly keyhole-shaped recess which is constructed on the other vehicle body section.

5. Removal aid according to claim 1,
wherein the other vehicle body section is a movable vehicle body section.

6. Removal aid according to claim 1,
wherein the at least one strap includes two straps.

7. Removal aid according to claim 6,
wherein in the tensioned condition, the straps extend essentially in parallel, particularly essentially in a vehicle travel direction.

8. Removal aid according to claim 1,
wherein a grip is assigned to the at least one strap, which grip, in particular, is sewn to the strap.

9. Removal aid according to claim 8,
wherein a tensioning device is assigned to the at least one strap, which tensioning device is used for interaction with a particularly keyhole-shaped recess which is constructed on the other vehicle body section.

10. Removal aid according to claim 1,
wherein at least one strap is guided at least at two points on the spare wheel receiving device.

11. Removal aid according to claim 10,
wherein the at least one strap is guided at least at two points on the spare wheel receiving device.

12. Removal aid according to claim 10,
wherein a grip is assigned to the at least one strap, which grip, in particular, is sewn to the strap.

13. Removal aid according to claim 10,
wherein a tensioning device is assigned to the at least one strap, which tensioning device is used for interaction with a particularly keyhole-shaped recess which is constructed on the other vehicle body section.

14. Removal aid according to claim 1,
wherein the spare wheel receiving device is essentially constructed in the shape of a half-shell.

15. Removal aid according to claim 14,
wherein the spare wheel receiving device comprises at least one rail-shaped strip.

16. Removal aid according to claim 15,
wherein a grip is assigned to the at least one strap, which grip, in particular, is sewn to the strap.

17. Removal aid according to claim 15,
wherein a tensioning device is assigned to the at least one strap, which tensioning device is used for interaction with a particularly keyhole-shaped recess which is constructed on the other vehicle body section.

18. Removal aid according to claim 15,
wherein the spare wheel receiving device comprises spare wheel fixing devices.

19. Removal aid according to claim 18,
wherein a grip is assigned to the at least one strap, which grip, in particular, is sewn to the strap.

20. Removal aid according to claim 18,
wherein a tensioning device is assigned to the at least one strap, which tensioning device is used for the interaction with a particularly keyhole-shaped recess which is constructed on the other vehicle body section.

21. Removal aid for a vehicle spare wheel comprising:
a spare wheel receiving member which in use extends under and supports a spare wheel and
a flexible strap extending under and slidably connected with the spare wheel receiving member,
wherein one end of said flexible strap is connected in use with a fixed part of the vehicle and an opposite end is movable from a spare wheel stowage position to a spare wheel removal position with tensioning of the flexible strap resulting in lifting of the spare wheel.

22. Removal aid according to claim 21,
wherein a pair of said flexible straps are provided which extend parallel to and spaced from one another under the spare wheel receiving member.

23. Removal aid according to claim 21,
wherein said strap is slidably supported at two positions on the spare wheel receiving member by belt loop like supports which permit relative sliding of the strap with respect to the spare wheel receiving member.

\* \* \* \* \*